United States Patent
Alcenius

[15] 3,667,109
[45] June 6, 1972

[54] VERTICAL BRAZING SYSTEM

[72] Inventor: James E. Alcenius, Jackson, Mich.
[73] Assignee: Aeroquip Corporation, Jackson, Mich.
[22] Filed: Apr. 20, 1970
[21] Appl. No.: 29,909

[52] U.S. Cl................................29/490, 29/470.9, 29/474.5, 29/488, 29/500, 285/286, 285/287
[51] Int. Cl.......................................................B23k 31/02
[58] Field of Search....................29/470.9, 474.5, 488, 490, 29/500; 285/286, 287

[56] References Cited

UNITED STATES PATENTS

| | | | |
|---|---|---|---|
| 1,931,311 | 10/1933 | Young | 29/490 UX |
| 3,286,341 | 11/1966 | Miller | 29/474.5 X |
| 3,419,953 | 1/1969 | Deimen | 29/488 X |
| 3,478,413 | 11/1969 | Gadd | 29/490 |

OTHER PUBLICATIONS

Brazing Manual, American Welding Society, Inc., copyright 1963, pp. 75–77.
Handy & Harman publication, " The Best Joint Designs for Silver Alloy Brazing," 1941, pp. 3–8.
Western Electric Technical Digest No. 2, April, 1966, " Method of Soldering a Pin to a Sleeve," by B. J. Costello, p. 19.

Primary Examiner—John F. Campbell
Assistant Examiner—Ronald J. Shore
Attorney—Jerry K. Harness

[57] ABSTRACT

A system for brazing together a fitting and tube while in a vertical position. A portion of the interior of the brazing alloy reservoir in the fitting is contaminated with a film of material such as aluminum before the brazing alloy ring is inserted in the reservoir. At the site, the tube is inserted in the fitting to which heat is then applied. Since the contaminant prevents the melted brazing alloy from adhering to a portion of the reservoir interior, the alloy is forced upwardly and downwardly into the annular gaps between the tube and fitting, into which it continues to be drawn by capillary action.

7 Claims, 6 Drawing Figures

INVENTOR
James E. Alcenius
BY Jerry K. Harness
ATTORNEY

VERTICAL BRAZING SYSTEM

BACKGROUND OF THE INVENTION

1. Field of the Invention

The invention relates to tube fittings of the type shown for example in U.S. Pat. No. 3,419,953 issued Jan. 7, 1969. Such fittings are used for example in aerospace systems and are intended to be brazed to lightweight tube components. On the site, it may be necessary to braze such fittings while in a substantially vertical position. It is imperative in such installations that the braze be effective in forming a leakproof connection.

2. Description of the Prior Art

The prior art is exemplified by the aforementioned patent. The fitting shown in said patent has an alloy reservoir in the form of an annular bead forming a cavity within which is inserted a brazing ring, the ring having a semicircular cross-sectional shape. The tube is inserted in the fitting so as to be surrounded by the ring, and heat is applied to the fitting to melt the braze alloy. However, it has been found that when such fittings are being brazed, in a vertical position particularly, the braze alloy oftentimes merely spins around inside the reservoir and does not flow to the annular capillary gaps on either side of the reservoir between the tube and fitting. Thus, brazing results are inconsistent and therefore unsatisfactory.

BRIEF SUMMARY OF THE INVENTION

According to the invention, a portion of the interior of the fitting alloy reservoir is contaminated by applying thereto a film of aluminum or a similar material which will prevent the brazing alloy from adhering to the surface. This contaminated area remains unwetted by the alloy when it melts, the reduced reservoir volume thus forcing the alloy from the reservoir in both directions into the capillary gaps where capillary action continues to draw the alloy from the reservoir. The result is a properly brazed joint which will satisfy visual and X-ray examinations required for sensitive installations.

DESCRIPTION OF THE PREFERRED EMBODIMENT

Figure 1:
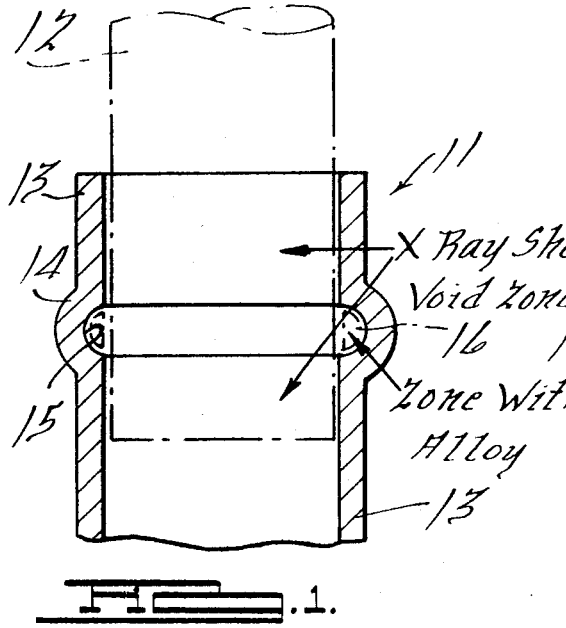
FIG. 1 is a cross-sectional view in elevation of a conventional brazing fitting indicating the zones which are void of alloy when the joint has been brazed in a vertical position, thus leading to a rejection of the braze.

FIG. 1 shows a conventional fitting generally indicated at 11 which is to brazed to a tube shown in dot-dash lines at 12 in FIG. 1. The fitting has cylindrical portions 13 between which is formed an alloy reservoir 14. This reservoir is of annular shape and is pressed outwardly from the main portions of the fitting to form a bead having a convex exterior, with the interior surface 15 of the reservoir being concave.

A brazing alloy ring 16 is inserted in fitting 11, this ring resting in reservoir 14. Ring 16 may be inserted as a split ring the parts of which are pinched together for insertion, or if the fitting has enough flexibility the member 16 may be a solid ring. Ring 16 preferably has a semicircular cross-sectional shape so as to permit insertion of tube 12. Annular capillary gaps 17 and 18 will be formed between the tube and fitting.

Figure 2:
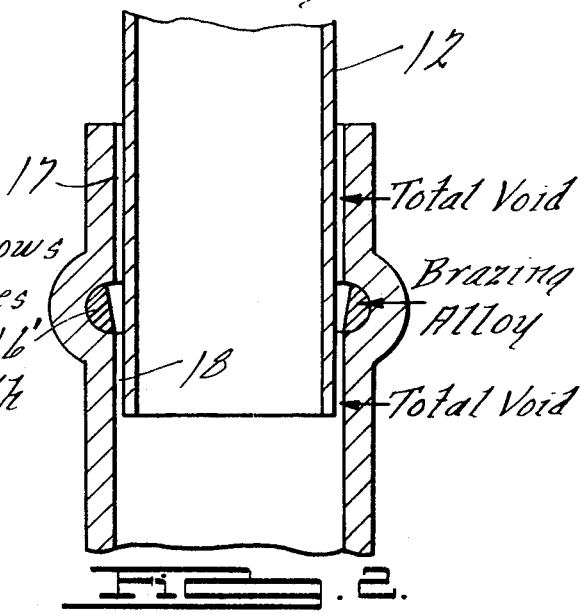
FIG. 2 is a view similar to FIG. 1 but showing the brazing alloy in the fitting.

During conventional brazing, heat is applied to the fitting by means of a suitable heating means, one such heater as shown in U.S. Pat. No. 3,268,703 issued Aug. 23, 1966. This is a portable induction heating unit which will cause the brazing alloy to melt. If the joint is in a substantially vertical position, it has been found with conventional constructions that the brazing alloy in reservoir 14 has a tendency in many cases to spin around inside the reservoir and not to flow into capillary gaps 17 and 18. The result, as is indicated in FIGS. 1 and 2, is that X-ray inspection will indicate void zones above and below the reservoir, resulting in a rejected braze. The resolidified brazing alloy is indicated at 16' in FIG. 2.

According to the invention, a film of a material such as aluminum is applied to a portion of reservoir interior surface 15 before brazing alloy ring 16 is inserted therein. Among other suitable materials are aluminum oxide, Nicrobraz green stop-off, or a similar material which will prevent the brazing alloy from adhering to the surface of the reservoir.

Figures 3, 4:
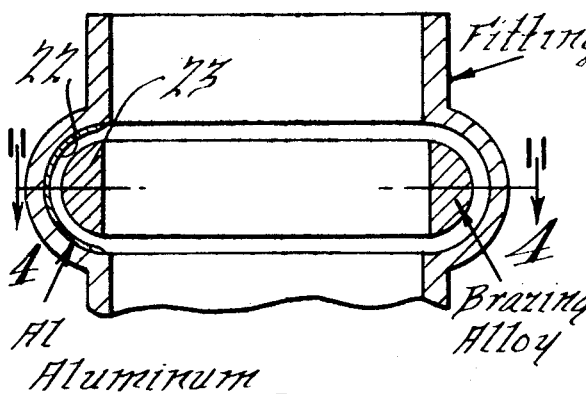
FIG. 3 is a fragmentary cross-sectional view in elevation of a fitting prepared in accordance with the present invention.
FIG. 4 is a cross-sectional plan view taken along the line 4—4 of FIG. 3 and showing the zone of contamination.
Figures 5, 6:
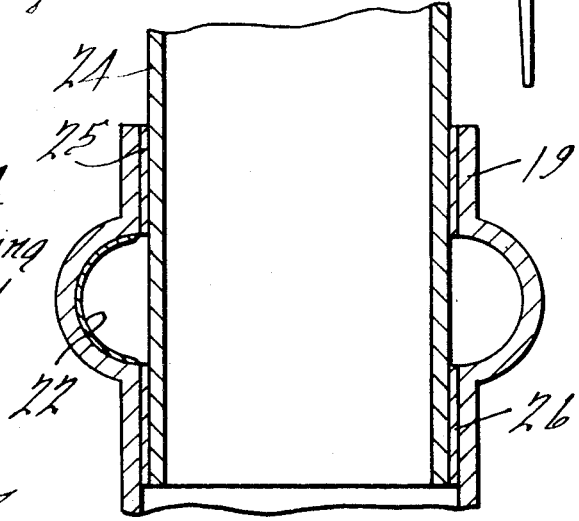
FIG. 5 is an elevational view of a tool which may be used to apply the contaminant to the reservoir interior.
FIG. 6 is a cross-sectional view similar to FIG. 2 but showing the brazing alloy having entered the capillary gaps in the joint.

FIGS. 3 and 4 show an area of approximately one-half the total area of surface 15 coated with aluminum. This is a very thin coating which may be applied by a tool such as that indicated at 20 in FIG. 5. This tool has a rounded end 21 which may be rubbed on the area marked 22 of FIGS. 3 and 4, the handle of tool 20 being used to reach inside fitting 11.

In a typical use of this invention, after the thin coating of aluminum or similar material has been applied to area 22 of the reservoir, the brazing alloy ring 23 will be snapped into position as shown in FIG. 3. If the fitting is to be used in a highly sensitive installation such as spacecraft use, the fitting may be packaged prior to use in order to maintain a condition of absolute cleanliness. At the site, the fitting 19 will be unpacked and tube 24 inserted therein. Heating the joint with a suitable brazing tool such as that shown in the aforementioned U.S. Pat. No. 3,268,703 will cause the braze alloy to melt. Upon encountering film 22 in the reservoir to which it cannot adhere, the braze alloy will be forced by its excess volume from the reservoir and into capillary gaps 25 and 26 above and below the reservoir respectively. The brazing material will fill these gaps by capillary action and the final joint will be shown in FIG. 6 with both capillary gap zones completely filled with braze material, thus forming a leakproof and fully satisfactory connection.

Although the problem solved by the present invention came to light in the area of vertical brazing it will be understood that the invention may also be used for brazing conditions of other angularity to insure the proper flow of the brazing material. It will be also understood that the invention may be utilized in other areas besides the Aerospace industry.

What is claimed is:

1. A method for brazing a tubular fitting of the type having an annular brazing alloy reservoir in the form of a bead to a tube, the steps comprising applying to a portion of the interior surface of said reservoir a contaminating material which prevents the melted brazing alloy to be used from adhering to the contaminated portion, inserting a ring of solid brazing alloy into and substantially filling said reservoir, inserting one end of said tube into said fitting to a position where said ring encompasses said tube end and said tube forms annular capillary gaps with said fitting on both sides of said reservoir, and heating said fitting and tube at said bead thereby melting said ring whereby the brazing alloy will wet only that portion of the interior reservoir surface to which the contaminant has not been applied and will thereby be forced out of the bead into the annular capillary gaps formed between the tube and fitting forming a brazed joint.

2. The method according to claim 1, the contaminating material being aluminum.

3. The method according to claim 1, the contaminating material being aluminum oxide.

4. The method according to claim 1, the contaminating material being Nicrobraz green stop-off.

5. In a method for brazing a tube to a fitting of the type having an annular bead forming a brazing alloy reservoir and cylindrical portions on opposite sides of the bead, the steps of applying a film of a contaminant to a portion of the interior surface of said reservoir, inserting a brazing ring into said reservoir, protectively packaging said fitting, unpacking the fitting at the site of use, inserting the vertical tube end in the fitting a predetermined distance past said reservoir, and heating the fitting to cause the brazing alloy to melt, whereby the brazing alloy will wet only that portion of the interior reservoir surface to which the contaminant has not been applied and will thereby be forced out of the bead into the annular capillary gaps formed between the tube and fitting forming a brazed joint.

6. The method according to claim 5, in which the contaminant is applied by a tool of said contaminating material having a handle portion at one end and a reservoir surface engaging portion at the other end.

7. The combination according to claim 6, in which said contaminating material and said tool are aluminum.

* * * * *